UNITED STATES PATENT OFFICE.

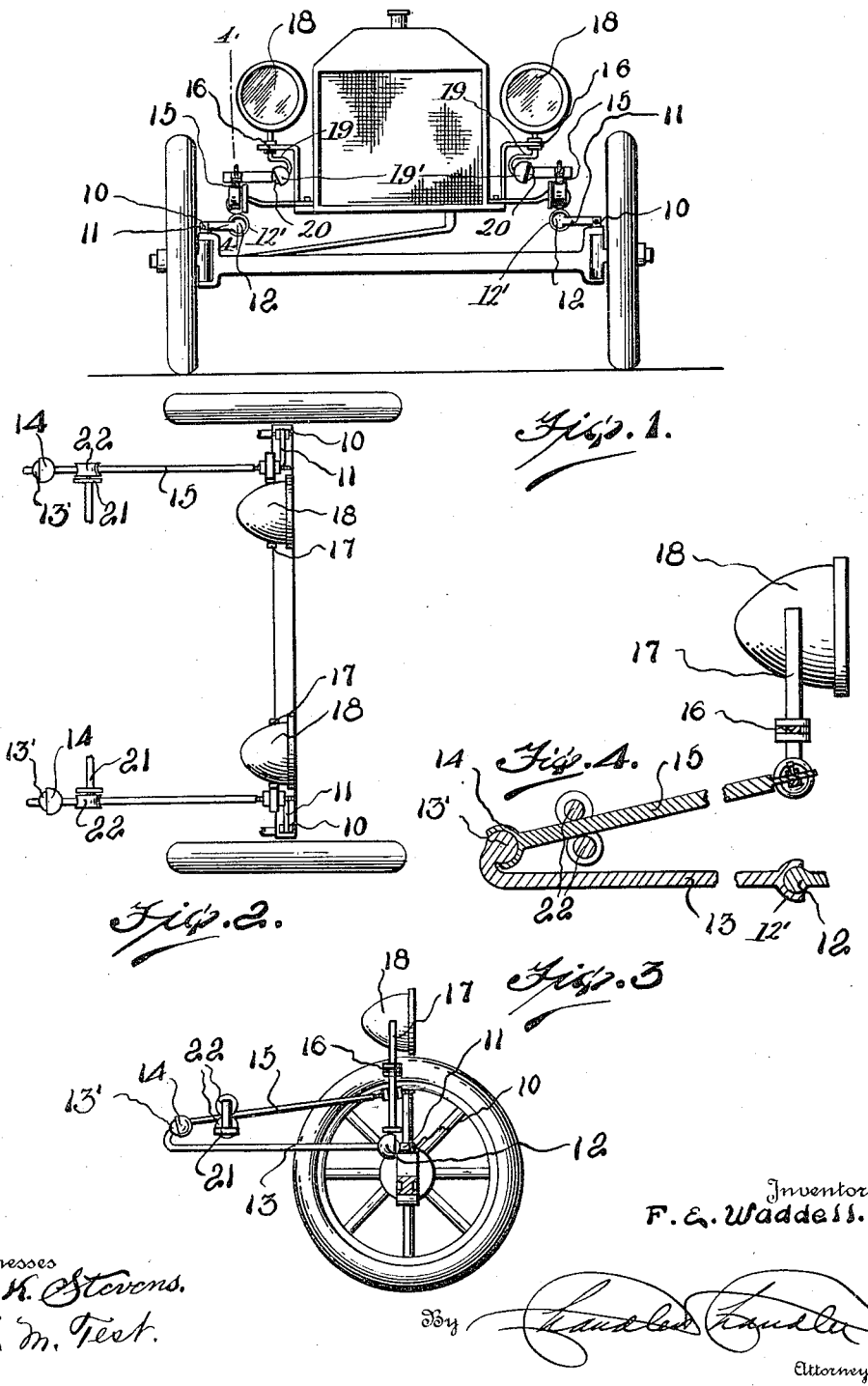

FRANK E. WADDELL, OF INGOMAR, MONTANA.

DIRIGIBLE HEADLIGHT.

1,193,850. Specification of Letters Patent. Patented Aug. 8, 1916.

Application filed September 25, 1915. Serial No. 52,673.

*To all whom it may concern:*

Be it known that I, FRANK E. WADDELL, a citizen of the United States, residing at Ingomar, in the county of Rosebud, State of Montana, have invented certain new and useful Improvements in Dirigible Headlights; and I do hereby declare the following to be a full, clear, and exact description of the invention, such as will enable others skilled in the art to which it appertains to make and use the same.

This invention relates to improvements in dirigible headlights for automobiles.

One object of the invention is to provide a device of this character which is simple in construction, efficient in operation, and which can be manufactured and sold at a comparatively low cost whereby the same can be applied to old or new automobiles.

Other objects and advantages will be apparent from the following description when taken in connection with the accompanying drawing.

In the drawing: Figure 1 is a front elevation of my headlight steering mechanism, Fig. 2 is a plan view of the same, Fig. 3 is a side elevation viewed from a point inwardly of the wheel, and Fig. 4 is a longitudinal section on the line 4—4 of Fig. 1.

Referring particularly to the accompanying drawing, 10 represents one of the knuckles which is provided with an inwardly extending arm 11 having a ball head 12 on its inner end. This head is adapted to engage a socket 12' formed on the forward end of a rearwardly extending rod 13, the rear end of which is also provided with a ball head 13' which is engaged in a socket 14 carried by a rod 15 extending forwardly therefrom, and in divergent relation thereto. A lamp bracket 16 is mounted on the frame of the machine in the usual manner, and extending vertically through the outer portion of the bracket is the post 17 which supports the lamp 18. The lower end of this post is provided with a laterally directed arm 19 which has on its outer end a socket 19' in which is the ball head 20 on the forward end of the before-mentioned lever 15. Mounted on the frame of the automobile is a bracket 21 which supports a pair of grooved rollers 22 between which the rod 15 is adapted to slide. Thus the rod 15 is properly supported and is guided, in its forward and rearward movements.

The ball and socket joints provide easy movement for the parts, so that there will be no great strain on the joints when the machine is passing over rough roads.

What is claimed is:

A mechanism for steering the headlight of an automobile comprising an arm carried by the steering knuckle of the automobile, a pair of rearwardly extending converging rods, a ball and socket connection between one of said rods and the arm, a rotary lamp supporting post, a ball and socket connection between the other rearwardly extending rod and the lamp supporting post, and a bracket carrying a pair of grooved rollers adapted to receive and guide one of said converging rods.

In testimony whereof, I affix my signature, in the presence of two witnesses.

FRANK E. WADDELL.

Witnesses:
W. P. CRAIG,
C. D. PICKARD.

Copies of this patent may be obtained for five cents each, by addressing the "Commissioner of Patents, Washington, D. C."